United States Patent
Jang et al.

(10) Patent No.: US 8,520,168 B2
(45) Date of Patent: Aug. 27, 2013

(54) REFLECTIVE COLOR DISPLAY DEVICE

(75) Inventors: Jae-eun Jang, Seoul (KR); Jae-eun Jung, Seoul (KR); Gae-hwang Lee, Hwaseong-si (KR); Kyu-young Hwang, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 263 days.

(21) Appl. No.: 12/926,949

(22) Filed: Dec. 20, 2010

(65) Prior Publication Data
US 2011/0299014 A1 Dec. 8, 2011

(30) Foreign Application Priority Data
Jun. 8, 2010 (KR) .................. 10-2010-0053994

(51) Int. Cl.
*G02F 1/1333* (2006.01)
*G02F 1/1335* (2006.01)

(52) U.S. Cl.
USPC .......................................... 349/86; 349/106

(58) Field of Classification Search
USPC .................................... 349/86, 106
See application file for complete search history.

(56) References Cited

U.S. PATENT DOCUMENTS

| 5,629,783 | A | * | 5/1997 | Kanbara et al. ............... 349/70 |
| 5,719,647 | A | * | 2/1998 | Fujikawa et al. ............. 349/40 |
| 6,373,538 | B2 | * | 4/2002 | Okumura et al. ............ 349/106 |
| 2002/0015121 | A1 | | 2/2002 | Okumura et al. |

FOREIGN PATENT DOCUMENTS

| JP | 6-289381 A | | 10/1994 |
| JP | 8-054618 A | | 2/1996 |
| JP | 08054618 A | * | 2/1996 |
| JP | 9-281489 A | | 10/1997 |
| JP | 2001-166340 A | | 6/2001 |
| JP | 2001166340 A | * | 6/2001 |
| KR | 1999-0035822 A | | 5/1999 |

* cited by examiner

*Primary Examiner* — Mike Qi
(74) *Attorney, Agent, or Firm* — Harness, Dickey & Pierce, P.L.C.

(57) ABSTRACT

Example embodiments are directed to a reflective color display device including a first substrate and a second substrate spaced apart from each other; a plurality of first and second electrodes respectively on the first and second substrates; a polymer dispersed liquid crystal (PDLC) layer between the first and second electrodes and including a polymer and liquid crystals in the polymer; and a CMY color filter on the second substrate.

14 Claims, 7 Drawing Sheets

REFLECTIVE COLOR DISPLAY DEVICE

CROSS-REFERENCE TO RELATED APPLICATIONS

This application claims priority under 35 U.S.C. §119 to Korean Patent Application No. 10-2010-0053994, filed on Jun. 8, 2010, in the Korean Intellectual Property Office, the disclosure of which is incorporated herein in its entirety by reference.

BACKGROUND

1. Field

Example embodiments relate to display devices, and to reflective color display devices including polymer dispersed liquid crystals (PDLC).

2. Description of the Related Art

Polymer dispersed liquid crystals (PDLC) scatter and/or transmit light by adjusting a difference in the refractive indices of liquid crystals and polymers. Accordingly, the PDLC are used in reflective display devices for displaying information or images by using an external light source. Reflective color display devices including the PDLC may include a color filter for color realization. In detail, light is transmitted through the color filter so as to display images having predetermined/desired colors.

The color filter may be, for example, a RGB color filter including red, green, and blue color filter layers. In this case, light transmissivity may be ideally ⅓ of external incident light (white light). When a reflectivity of the PDLC is from about 10% to about 20%, a reflectivity of the reflective PDLC display device including a RGB filter may be from about 3.3% to about 6.6%, indicating that a very dark image is obtained therefrom. Accordingly, the brightness of the reflective display device needs to be improved.

SUMMARY

According to example embodiments, a reflective color display device includes a first substrate and a second substrate spaced apart from each other; a plurality of first and second electrodes respectively on the first and second substrates; a polymer dispersed liquid crystal (PDLC) layer between the first and second electrodes and including a polymer and liquid crystals in the polymer; and a cyan magenta yellow (CMY) color filter on the second substrate and including cyan, magenta, and yellow color filter layers.

According to example embodiments, an absorption layer that absorbs incident light or a material layer that reflects the incident light outside a range of a viewing angle is on the first substrate.

According to example embodiments, the PDLC layer further includes a black dye.

According to example embodiments, the black dye includes a dichroic dye having optical anisotropy.

According to example embodiments, a reflection layer that reflects incident light is on the first substrate.

According to example embodiments, the first and second substrates are transparent substrates, and the first and second electrodes include transparent conductive materials.

According to example embodiments, the plurality of first electrodes correspond to the cyan, magenta, and yellow color filter layers, and the plurality of second electrodes are a single unit that functions as a common electrode.

According to example embodiments, the first and second electrodes are stripes that cross each other.

According to example embodiments, a reflective color display device includes a first substrate and a second substrate spaced apart from each other; a plurality of first and second electrodes respectively on the first and second substrates; a polymer dispersed liquid crystal (PDLC) layer between the first and second electrodes and including a polymer and liquid crystals in the polymer; a cyan magenta yellow (CMY) color filter on the second substrate and including cyan, magenta, and yellow color filter layers; and a reflection layer on the first substrate and configured to reflect incident light.

According to example embodiments, the PDLC layer further includes a black dye.

According to example embodiments, the black dye includes a dichroic dye having optical anisotropy.

According to example embodiments, the first and second substrates are transparent substrates, and the first and second electrodes include transparent conductive materials.

According to example embodiments, the plurality of first electrodes correspond to the cyan, magenta, and yellow color filter layers, and the plurality of second electrodes are a single unit that functions as a common electrode.

According to example embodiments, the first and second electrodes are stripes that cross each other.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1A:
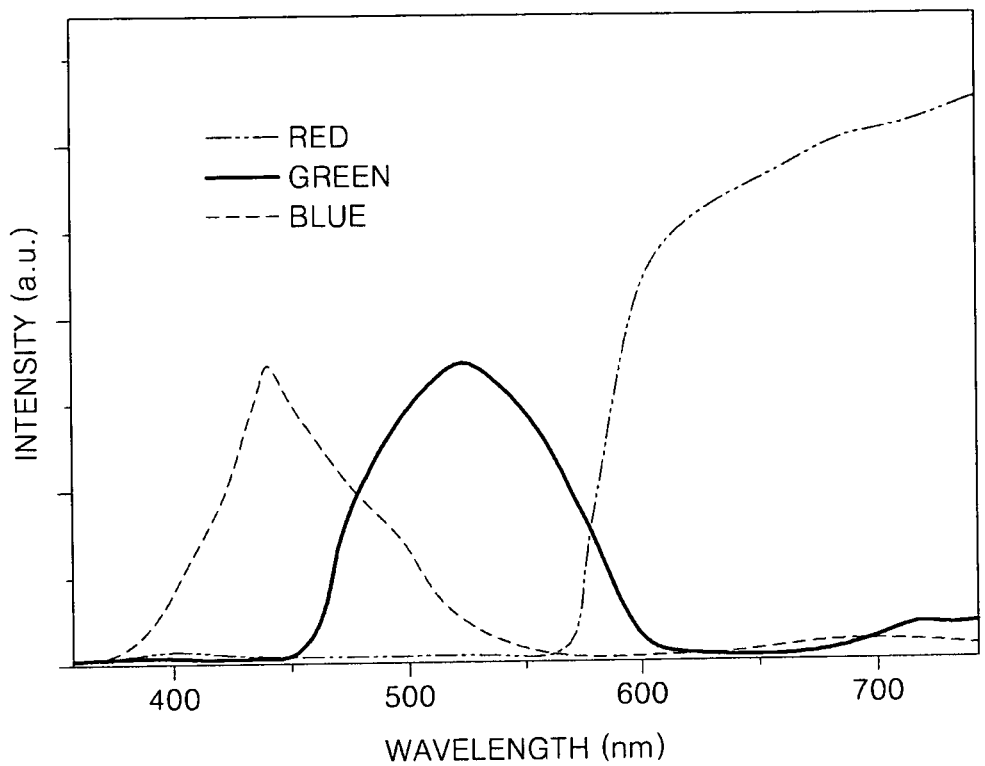
FIG. 1A illustrates absorption spectrums of red light, green light, and blue light.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1B:
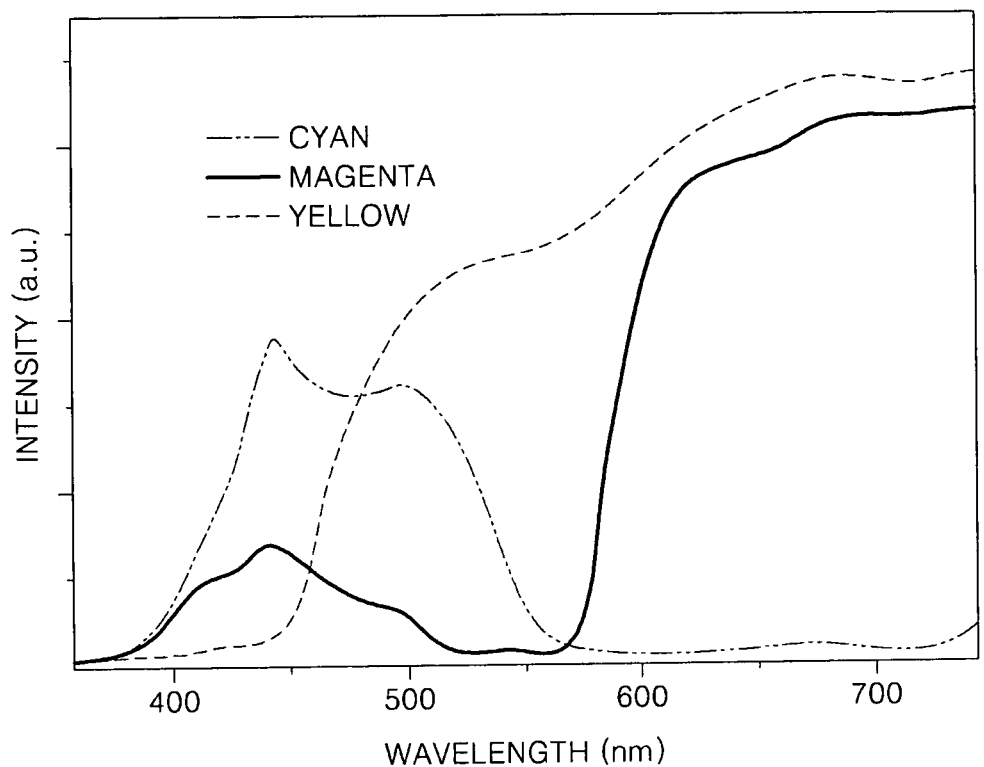
FIG. 1B illustrates absorption spectrums of cyan light, magenta light, and yellow light.

FIG. 1A illustrates absorption spectrums of red light, green light, and blue light, and FIG. 1B illustrates absorption spectrums of cyan light, magenta light, and yellow light. Referring to FIG. 1A, red light, green light, and blue light have different wavelength ranges. Referring to FIG. 1B, cyan light is a combination of green light and blue light, and magenta light is a combination of red light and blue light, and yellow light is a combination of green light and red light.

When a RGB color filter formed of red, green, and blue color filter layers is used as a color filter, a light transmissivity of the RGB color filter with respect to external white light may be about ⅓. Meanwhile, when a CMY color filter including cyan, magenta, and yellow color filter layers is used as a color filter, a light transmissivity of the CMY color filter with respect to external white light may be about ⅔. Thus the light transmissivity of the CMY color filter is about twice as that of the RGB color filter. Accordingly, when the CMY color filter is used in a reflective color display device, reflectivity of the reflective color display device is increased so as to increase the brightness of the reflective color display device and to generate clearer images. Therefore, according to example embodiments, the CMY color filter including cyan, magenta, and yellow color filter layers is used as a color filter for color realization.

Figure 2:
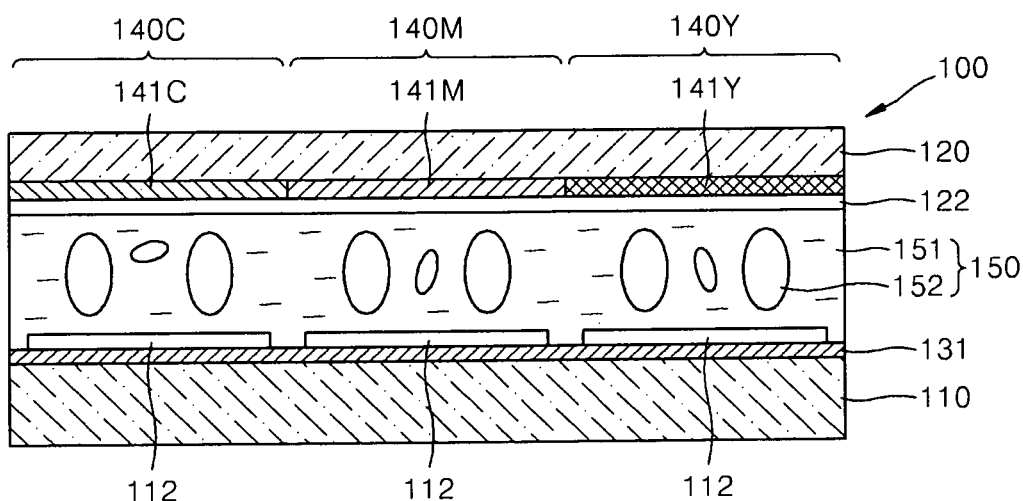
FIG. 2 is a cross-sectional view illustrating a reflective color display device according to example embodiments.

FIG. 2 is a cross-sectional view illustrating a reflective color display device according to example embodiments.

Referring to FIG. 2, the reflective color display device includes a plurality of pixel units 100, which each comprise sub-pixels having desired colors, namely cyan, magenta, and yellow sub-pixels 140C, 140M, and 140Y. The pixel units 100 may each be formed of a cyan sub-pixel 140C, a magenta sub-pixel 140M, and a yellow sub-pixel 140Y. In FIG. 2, one of the pixel units 100 is shown for convenience of description. The pixel unit 100 may be formed of a cyan sub-pixel 140C, a magenta sub-pixel 140M, and a yellow sub-pixel 140Y. The cyan, magenta, and yellow sub-pixels 140C, 140M, and 140Y respectively correspond to cyan, magenta, and yellow color filter layers 141C, 141M, and 141Y, which will be described later.

The pixel units 100 include first and second substrates 110 and 120 spaced apart from each other, a plurality of first and second electrodes 112 and 122 respectively formed on the first and second substrates 110 and 120, a polymer dispersed liquid crystal (PDLC) layer 150 formed between the first and second electrodes 112 and 122, a CMY color filter, which includes the cyan, magenta, and yellow color filter layers 141C, 141M, and/or 141Y, formed on the second substrate 120, and an absorption layer 131 formed on the first substrate 110.

In detail, the first substrate 110, which is a lower substrate, and the second substrate 120, which is an upper substrate, may be transparent substrates. The first and second substrates 110 and 120 may be formed of glass or plastic. However, the first and second substrates 110 and 120 are not limited thereto and may also be formed of other materials. The absorption layer 131, which absorbs incident light, is formed on an upper surface of the first substrate 110. Alternatively, unlike shown in FIG. 2, the absorption layer 131 may also be formed on a lower surface of the first substrate 110. Meanwhile, according to the example embodiments, a material layer (not shown) that reflects incident light at a predetermined/desired angle may be applied instead of the absorption layer 131. The material layer reflects the incident light out of a range of a viewing angle of an observer, thus functioning as the absorption layer 131 within the range of the viewing angle of the observer.

The CMY color filter is disposed on a lower surface of the second substrate 120 that is the upper substrate. The CMY color filter includes the cyan color filter layer 141C, the magenta color filter layer 141M, and/or the yellow color filter layer 141Y.

A plurality of first electrodes 112 are formed on the first substrate 110, on which the absorption layer 131 is formed, and the plurality of second electrodes 122 are formed on the second substrate 120, on which the CMY color filter is formed. Unlike shown in FIG. 2, the CMY color filter may also be formed on lower surfaces of the second electrodes 122. For example, the first and second electrodes 112 and 122 may be formed of a transparent conductive material, such as an indium tin oxide (ITO). In a passive matrix (PM) type display device, the first electrodes 112 may be in a form of stripes and be arranged parallel to one another, and the second electrodes 122 may also be in a form of stripes and arranged parallel to one another across the first electrodes 112. In an active matrix (AM) type display device, the first electrodes 112 are formed in a form corresponding to the cyan sub-pixels 140C, the magenta sub-pixels 140M, and/or the yellow sub-pixels 140Y, and the second electrodes 122 may be formed as a single unit so as to function as a common electrode.

The PDLC layer 150 is formed between the first electrodes 112 and the second electrodes 122. The PDLC layer 150 includes a polymer 151 and liquid crystals 152 dispersed in the polymer 151. The PDLC layer 150 may scatter or transmit light by adjusting a difference in the refractive indices of the liquid crystals 152 and the polymer 151.

Figure 3:
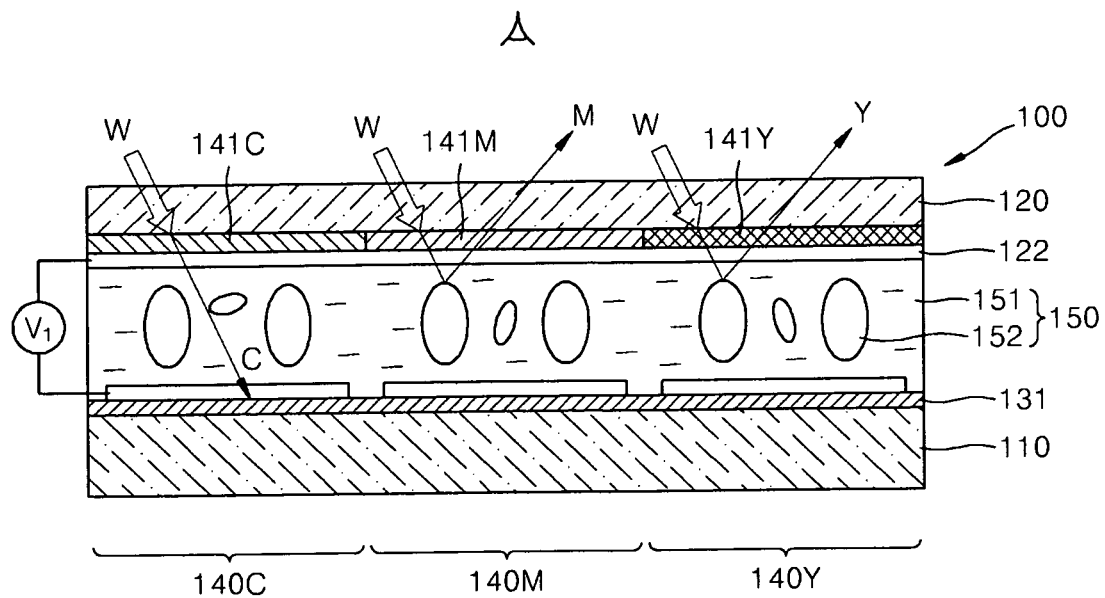
FIG. 3 is a schematic view illustrating a driving method of the reflective color display device of FIG. 2, according to example embodiments.

FIG. 3 is a schematic view illustrating a driving method of the reflective color display device of FIG. 2, according to example embodiments.

Referring to FIG. 3, when a desired voltage $V_1$ is applied to the first and second electrodes 112 and 122 corresponding to the cyan sub-pixel 140C, liquid crystal molecules (not shown) of the liquid crystals 152 corresponding to the cyan sub-pixel 140C are aligned parallel to an electrical field formed between the first electrodes 112 and the second electrodes 122. Accordingly, a refractive index of the liquid crystals 152 becomes somewhat similar to that of the polymer 151, and thus the PDLC layer 150 of the cyan sub-pixel 140C may become transparent. Accordingly, in the cyan sub-pixel 140C, only cyan light C among external white light W transmits through the cyan color filter layer 141C, and then through the PDLC layer 150 to be absorbed by the absorption layer 131. In the magenta and yellow sub-pixels 140M and 140Y to which no voltage is applied, the PDLC layer 150 scatters incident light due to a difference in the refractive indices of the polymer 151 and the liquid crystals 152. Accordingly, in the magenta sub-pixel 140M, only magenta light M among external white light W transmits through the magenta color filter layer 141M, is scattered by the PDLC layer 150, and is emitted to the outside through the second substrate 120, which is the upper substrate. Also, in the yellow sub-pixel 140Y, only yellow light Y among external white light W transmits through the yellow color filter layer 141Y, is scattered by the PDLC layer 150, and is emitted to the outside through the second substrate 120, which is the upper substrate. As described above, the cyan sub-pixel 140C displays black color, and the magenta and yellow sub-pixels 140M and 140Y respectively emit magenta light M and yellow light Y such that the observer recognizes the pixel units 100 as a red color.

Figure 4:
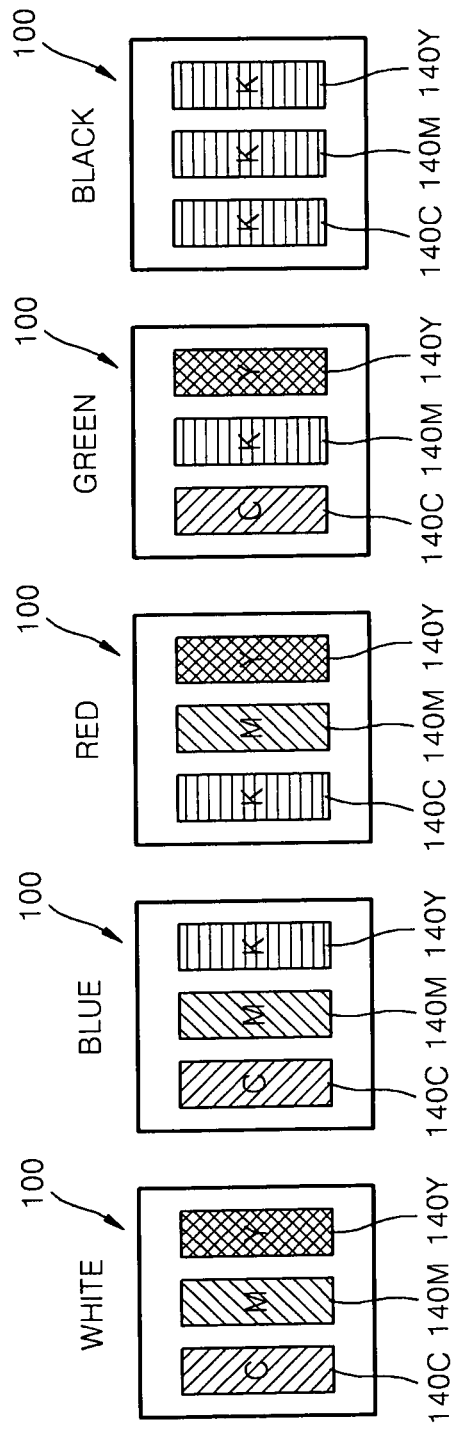
FIG. 4 illustrates examples of colors that may be recognized by an observer using the reflective color display device of FIG. 2.

In the above-described manner, various colors may be realized through the pixel units 100 by adjusting voltages each applied to the cyan sub-pixels 140C, the magenta sub-pixels 140M, and/or the yellow sub-pixels 140Y. FIG. 4 illustrates example five colors (white, blue, red, green, and black) that may be recognized by an observer by adjusting voltages applied to each of the cyan sub-pixels 140C, the magenta sub-pixels 140M, and the yellow sub-pixels 140Y of the reflective color display device of FIG. 2.

As described above, by using the CMY color filter in the reflective color display device including the PDLC layer 150, reflectivity of the reflective color display device may be improved, compared to when using a RGB color filter, which increases the brightness of a screen, and clearer images are obtained accordingly.

Figure 5:
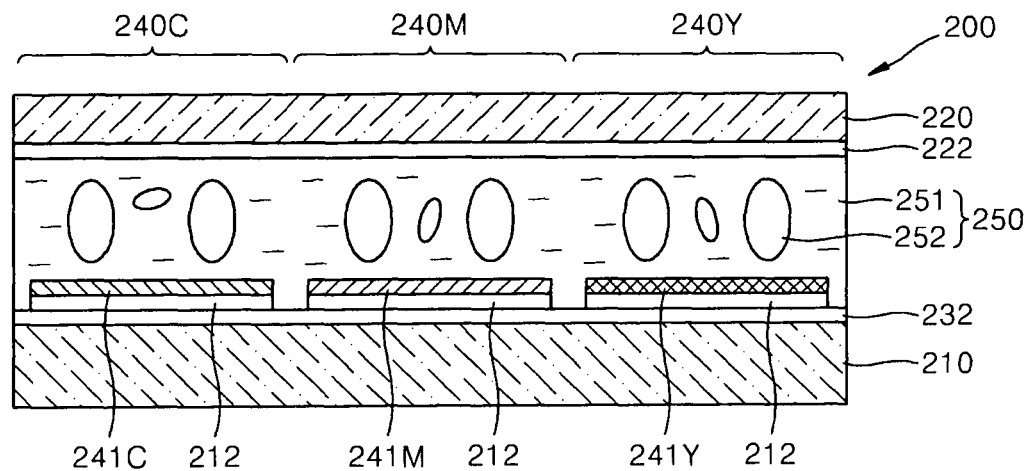
FIG. 5 is a cross-sectional view illustrating a reflective color display device according to example embodiments.

FIG. 5 is a cross-sectional view illustrating a reflective color display device according to example embodiments.

Referring to FIG. 5, the reflective color filter display device includes a plurality of pixel units 200 which are each formed of sub-pixels having desired colors, namely cyan, magenta, and/or yellow sub-pixels 240C, 240M, and 240Y. In FIG. 5, one of the pixel units 200 is shown for convenience of description. The pixel unit 200 may be formed of a cyan sub-pixel 240C, a magenta sub-pixel 240M, and/or a yellow sub-pixel 240Y.

The pixel units 200 include first and second substrates 210 and 220 spaced apart from each other, a plurality of first and second electrodes 212 and 222 respectively formed on the first and second substrates 210 and 220, a PDLC layer 250 formed between the first and second electrodes 212 and 222, and a CMY color filter, which includes the cyan, magenta, and/or yellow color filter layers 241C, 241M, and 241Y, and a reflection layer 232 formed on the first substrate 210.

The first substrate 210, which is a lower substrate, and the second substrate 220, which is an upper substrate, may be transparent substrates. The reflection layer 232 that reflects incident light is formed on an upper surface of the first substrate 210. Alternatively, the reflection layer 232 may also be formed on a lower surface of the first substrate 210, unlike shown in FIG. 5.

The plurality of first electrodes 212 are formed on an upper surface of the reflection layer 232 of the first substrate 210, and the plurality of second electrodes 222 are formed on a lower surface of the second substrate 220. The first and second electrodes 212 and 222 may be formed of transparent conductive materials as described above. In a PM type display device, the first electrodes 212 may be in a form of stripes and be arranged parallel to one another, and the second electrodes 222 may also be in a form of stripes and arranged parallel to one another across the first electrodes 212. In an AM type display device, the first electrodes 212 are formed in a form corresponding to the cyan, magenta, and/or yellow sub-pixels 240C, 240M, and 240Y, and the second electrodes 222 may be formed as a single unit so as to function as a common electrode.

The CMY color filter is formed on upper surfaces of the first electrodes 212. The CMY color filter includes the cyan color filter layer 241C, the magenta color filter layer 241M, and/or the yellow color filter layer 241Y. Unlike as shown in FIG. 5, the CMY color filter may also be formed on lower surfaces of the first electrodes 212. The PDLC layer 250 is formed between the first electrodes 212 and the second electrodes 222. The PDLC layer 250 includes a polymer 251 and liquid crystals 252 dispersed in the polymer 251.

Figure 6:
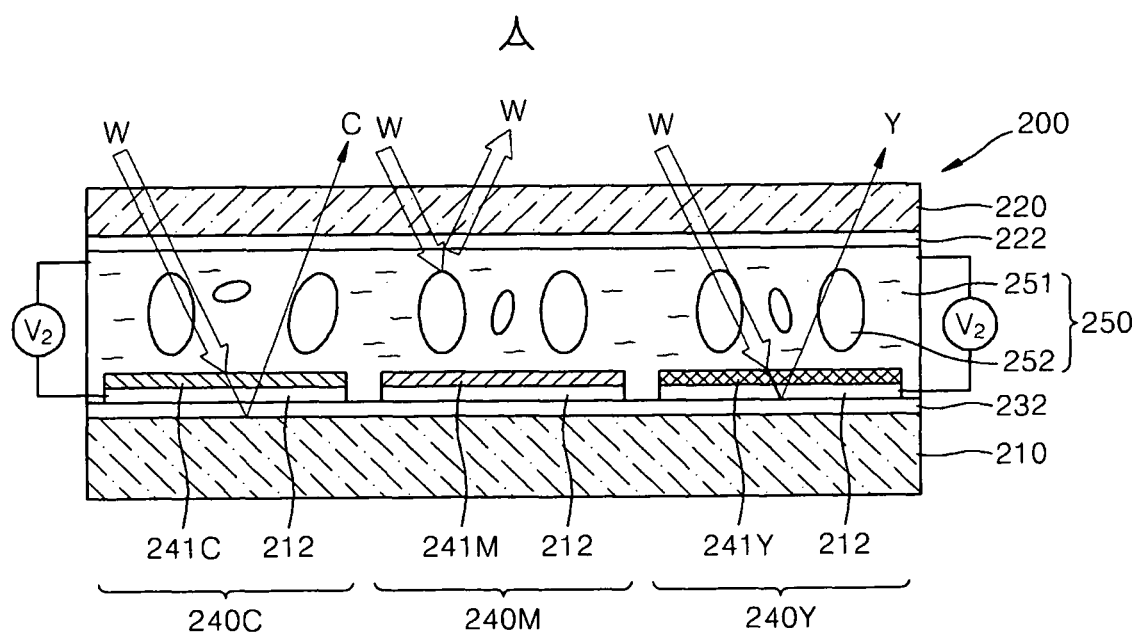
FIG. 6 is a schematic view illustrating a driving method of the reflective color display device of FIG. 5, according to example embodiments.

FIG. 6 is a schematic view illustrating a driving method of the reflective color display device of FIG. 5, according to example embodiments.

Referring to FIG. 6, when a desired voltage $V_2$ is applied to the first and second electrodes 212 and 222 corresponding to the cyan and yellow sub-pixel 240C and 240Y, liquid crystal molecules (not shown) of the liquid crystals 252 corresponding to the cyan and yellow sub-pixel 240C and 240Y are aligned parallel to an electrical field formed between the first electrodes 212 and the second electrodes 222. Accordingly, a refractive index of the liquid crystals 252 becomes approximately similar to that of the polymer 251, and thus the PDLC layer 250 of the cyan sub-pixel 240C becomes transparent. Accordingly, external white light W transmits through the PDLC layer 250 and is incident on the cyan color filter layer 241C. Also, only cyan light C among the white light W transmits through the cyan color filter layer 241C, is reflected by the reflection layer 232, and emitted to the outside through the second substrate 220. In the yellow sub-pixel 240Y, the external white light W transmits through the PDLC layer 250 and is incident on the yellow color filter layer 241Y. Then, only yellow light Y transmits through the yellow color filter layer 241Y among the white light W, is reflected by the reflection layer 232, and emitted to the outside through the second substrate 220. In the magenta sub-pixel 240M to which no voltage is applied, the PDLC layer 250 scatters the incident light due to a difference in the refractive indices of the polymer 251 and the liquid crystals 252. Accordingly, the external white light W is scattered by the PDLC layer 250 in the magenta sub-pixel 240M and is emitted to the outside through the second substrate 220. As described above, the magenta sub-pixel 240M displays white color, and the cyan and yellow sub-pixels 240C and 240Y respectively emit cyan light C and yellow light Y such that the observer recognizes the pixel unit 200 as a green color. In the reflective color display device of example embodiments, white color characteristics of images are increased, compared to the previous example embodiments.

Figure 7:
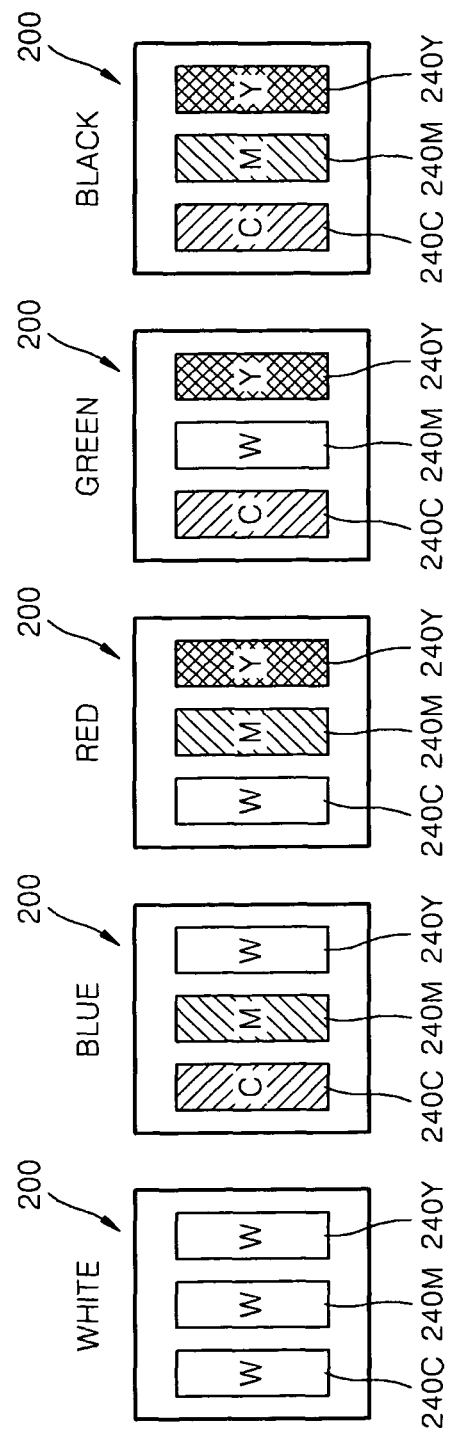
FIG. 7 illustrates examples of colors that may be recognized by an observer using the reflective color display device of FIG. 5.

As described above, various colors may be obtained through the pixel units 200 by adjusting voltages applied to the cyan, magenta, and/or yellow sub-pixels 240C, 240M, and 240Y. FIG. 7 illustrates example five colors (white, blue, red, green, and black) that may be recognized by an observer by adjusting voltages applied to each of the cyan sub-pixels 240C, the magenta sub-pixels 240M, and/or the yellow sub-pixels 240Y of the reflective color display device of FIG. 5.

Figure 8:
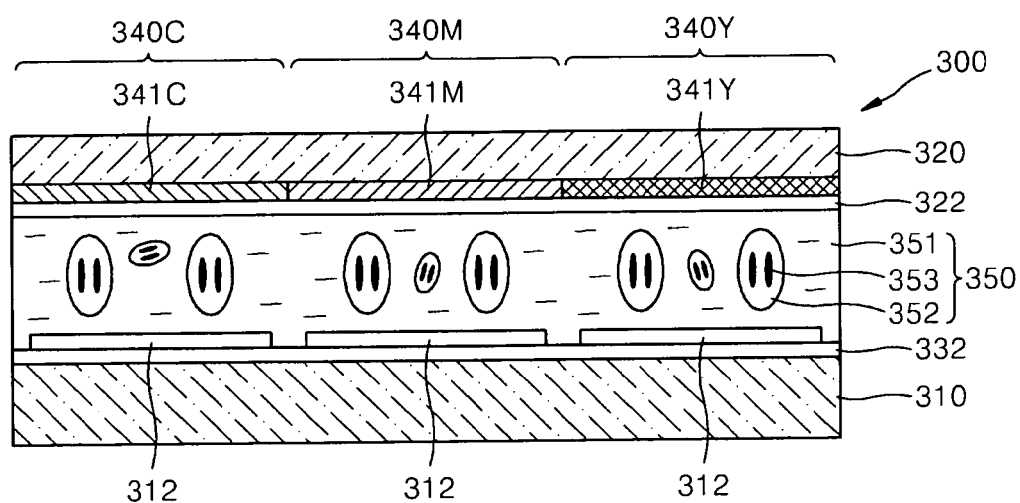
FIG. 8 is a cross-sectional view illustrating a reflective color display device according to example embodiments.

FIG. 8 is a cross-sectional view illustrating a reflective color display device according to example embodiments.

Referring to FIG. 8, the reflective color filter display device includes a plurality of pixel units 300 which are each formed of sub-pixels having colors, cyan, magenta, and yellow sub-pixels 340C, 340M, and/or 340Y. In detail, the pixel units 300 may each be formed of a cyan sub-pixel 340C, a magenta sub-pixel 340M, and/or a yellow sub-pixel 340Y.

The pixel units 300 include first and second substrates 310 and 320 spaced apart from each other, a plurality of first and second electrodes 312 and 322 respectively formed on the first and second substrates 310 and 320, a PDLC layer 350 that is formed between the first and second electrodes 312 and 322 and includes a black dye 353, and a CMY color filter formed on the second substrate 320, and a reflection layer 332 formed on the first substrate 310.

The first and second substrates 310 and 320 may be transparent substrates. The reflection layer 332 that reflects incident light is formed on an upper surface of the first substrate 310. Alternatively, the reflection layer 322 may also be formed on a lower surface of the first substrate 310, unlike shown in FIG. 8. The CMY color filter is formed on a lower surface of the second substrate 320, which is an upper substrate. The CMY color filter includes cyan, magenta, and/or yellow color filter layers 341C, 341M, and 341Y.

The first electrodes 312 are formed on the first substrate 310, on which the reflection layer 332 is formed, and the second electrodes 322 are formed on the second substrate 320, on which the CMY color filter is formed. Unlike as shown in FIG. 8, the CMY color filter may also be formed on lower surfaces of the second electrodes 322. The first and second electrodes 312 and 322 may be formed of a transparent conductive material. In a PM type display device, the first electrodes 312 may be in a form of stripes and be arranged parallel to one another, and the second electrodes 322 may also be in a form of stripes and arranged parallel to one another across the first electrodes 312. In an AM type display device, the first electrodes 312 are formed in a form corresponding to the cyan sub-pixels 340C, the magenta sub-pixels 340M, and/or the yellow sub-pixels 340Y, and the second electrodes 322 may be formed as a single unit so as to function as a common electrode.

The PDLC layer 350 is formed between the first electrodes 312 and the second electrodes 322. The PDLC layer 350 includes a polymer 351, liquid crystals 352 dispersed in the polymer 351, and/or the black dye 353 formed in the liquid crystals 352. The black dye 353 may be a dichroic dye having optical anisotropy.

The reflective color display device of FIG. 8 is driven in the following manner. For example, no voltage is applied to the cyan sub-pixel 340C, and voltages are applied to the magenta and yellow sub-pixels 340M and 340Y. In this case, liquid crystal molecules (not shown) and the black dye 353 included in the liquid crystals 352 of the cyan sub-pixels 340C are irregularly aligned. Accordingly, in the cyan sub-pixel 340C, only cyan light among external white light transmits through the cyan color filter layer 341C, and the cyan light is absorbed by the black dye 353 in the PDLC layer 350. Liquid crystal molecules and the black dye 353 included in the liquid crystals 352 corresponding to the magenta and yellow sub-pixels 340M and 340Y are aligned parallel to an electric field applied thereto, and the PDLC layer 350 becomes transparent accordingly. Consequently, in the magenta sub-pixel 340M, only magenta light among external white light transmits through the magenta color filter layer 341M, and the magenta light transmits through the PDLC layer 350 and then is reflected by the reflection layer 332, and is emitted to the outside through the second substrate 320, which is the upper substrate. In the yellow sub-pixel 340Y, only yellow light among external white light transmits through the yellow color filter layer 341Y, and the yellow light transmits through the PDLC layer 350 and is reflected by the reflection layer 332, and is emitted to the outside through the second substrate 320, which is the upper substrate. As described above, the cyan sub-pixel 340C displays black color, and the magenta and yellow sub-pixels 340M and 340Y respectively emit magenta light M and yellow light Y such that the observer recognizes the pixel units 300 as a red color. As described above, various colors may be realized through the pixel units 300 by adjusting voltages each applied to the cyan, magenta, and/or yellow sub=pixels 340C, 340M, and 340Y.

Figure 9:
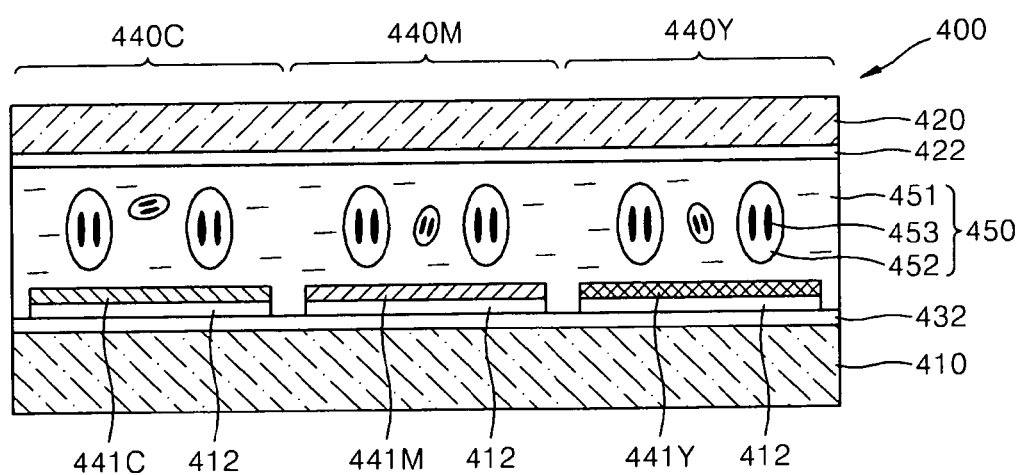
FIG. 9 is a cross-sectional view illustrating a reflective color display device according to example embodiments.

FIG. 9 is a cross-sectional view illustrating a reflective color display device according to example embodiments.

Referring to FIG. 9, the reflective color filter display device includes a plurality of pixel units 400 which are each formed of sub-pixels 440C, 440M, and 440Y having desired colors. In detail, the pixel units 400 each may be formed of a cyan sub-pixel 440C, a magenta sub-pixel 440M, and a yellow sub-pixel 440Y.

The pixel units 400 include first and second substrates 410 and 420 spaced apart from each other, a plurality of first and second electrodes 412 and 422 respectively formed on the first and second substrates 410 and 420, a PDLC layer 450 that is formed between the first and second electrodes 412 and 422 and includes a black dye 453, and a CMY color filter and a reflection layer 432 formed on the first substrate 410.

The first and second substrates 410 and 420 may be transparent substrates. The reflection layer 432 that reflects incident light is formed on an upper surface of the first substrate 410. Alternatively, the reflection layer 432 may also be formed on a lower surface of the first substrate 410, unlike shown in FIG. 9.

The first electrodes 412 are formed on an upper surface of the reflection layer 432, and the second electrodes 422 are formed on a lower surface of the second substrate 420. The first and second electrodes 412 and 422 may be formed of a transparent conductive material. In a PM type display device, the first electrodes 412 may be in a form of stripes and be arranged parallel to one another, and the second electrodes 422 may also be in a form of stripes and arranged parallel to one another across the first electrodes 412. In an AM type display device, the first electrodes 412 are formed in a form corresponding to the cyan, magenta, and/or yellow sub-pixels 440C, 440M, and 440Y, and the second electrodes 422 may be formed as a single unit so as to function as a common electrode.

The CMY color filter is formed on an upper surface of the first electrodes 412. The CMY color filter includes the cyan, magenta, and yellow color filter layers 441C, 441M, and/or 441Y. Unlike shown in FIG. 9, the CMY color filter may also be formed on a lower surface of the first electrodes 412. The PDLC layer 450 is formed between the first electrodes 412 and the second electrodes 422. The PDLC layer 450 includes a polymer 451, liquid crystals 452 dispersed in the polymer 451, and/or the black dye 453 formed in the liquid crystals 452. The black dye 453 may be dichroic dye having optical anisotropy.

The reflective color display device of FIG. 9 is driven in the following manner. For example, no voltage is applied to the cyan sub-pixel 440C, and voltages are applied to the magenta and yellow sub-pixels 440M and 440Y. In this case, liquid crystal molecules (not shown) and the black dye 453 included in the liquid crystals 452 of the cyan sub-pixels 440C are irregularly aligned. Accordingly, in the cyan sub-pixel 440C, external white light is absorbed by the black dye 453 in the PDLC layer 450. Liquid crystal molecules and the black dye 453 included in the liquid crystals 452 corresponding to the magenta and yellow sub-pixels 440M and 440Y are aligned parallel to an electric field applied thereto, and the PDLC layer 450 becomes transparent accordingly. Consequently, in the magenta sub-pixel 440M, external white light transmits through the PDLC layer 450, and only magenta light among the transmitted white light transmits through the magenta color filter layer 441M. Then the magenta light is reflected by the reflection layer 432, and is emitted to the outside through the second substrate 420, which is the upper substrate. In the yellow sub-pixel 440Y, external white light transmits through the PDLC layer 450, and only yellow light among the transmitted external white light transmits through the yellow color filter layer 441Y. Then the yellow light is reflected by the reflection layer 432, and is emitted to the outside through the second substrate 420, which is the upper substrate. As described above, the cyan sub-pixel 440C displays black color, and the magenta and yellow sub-pixels 440M and 440Y respectively emit magenta light and yellow light such that the observer recognizes the pixel unit 400 as a red color. As described above, various colors may be realized through the pixel units 400 by adjusting voltages each applied to the cyan, magenta, and yellow sub-pixels 440C, 440M, and 440Y.

As described above, according to example embodiments, by using the CMY filter including cyan, magenta, and yellow color filter layers, a reflective color display device having improved reflectivity, compared to when using a RGB color filter, may be manufactured.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A reflective color display device comprising:
a first substrate and a second substrate spaced apart from each other;
a plurality of first and second electrodes respectively on the first and second substrates;
a polymer dispersed liquid crystal (PDLC) layer between the first and second electrodes and including a polymer and liquid crystals in the polymer;
a cyan magenta yellow (CMY) color filter on the second substrate and including cyan, magenta, and yellow color filter layers, each one of the cyan, magenta, and yellow color filter layers corresponding to one of the plurality of first electrodes and one of the plurality of second electrodes; and
one of an absorption layer and a reflection layer on the first substrate configured to control a color of an emitted light by applying a voltage to the first and second electrodes corresponding to at least one of the cyan, magenta, and yellow color filter layers causing the liquid crystals of the PDLC layer to allow an external light travelling through the CMY color filter and the PDLC layer to be one of absorbed and reflected by the absorption layer and reflection layer respectively, such that no visible light is emitted from the reflective color display device, when no voltage is applied to the first and second electrodes corresponding to the at least one of the cyan, magenta, and yellow color filter layers the liquid crystals of the PDLC layer reflect visible light through the at least one of the cyan, magenta, and yellow color filter layers.

2. The reflective color display device of claim 1, wherein the absorption layer absorbs incident light and the reflection layer reflects incident light outside a range of a viewing angle.

3. The reflective color display device of claim 1, wherein the PDLC layer further includes a black dye.

4. The reflective color display device of claim 3, wherein the black dye includes a dichroic dye having optical anisotropy.

5. The reflective color display device of claim 3, wherein the reflection layer that reflects incident light is on the first substrate.

6. The reflective color display device of claim 1, wherein the first and second substrates are transparent substrates, and the first and second electrodes include transparent conductive materials.

7. The reflective color display device of claim 1, wherein the plurality of first electrodes correspond to the cyan, magenta, and yellow color filter layers, and the plurality of second electrodes are a single unit that functions as a common electrode.

8. The reflective color display device of claim 1, wherein the first and second electrodes are stripes that cross each other.

9. A reflective color display device comprising:
a first substrate and a second substrate spaced apart from each other;
a plurality of first and second electrodes respectively on the first and second substrates;
a polymer dispersed liquid crystal (PDLC) layer between the first and second electrodes and including a polymer and liquid crystals in the polymer;
a cyan magenta yellow (CMY) color filter on the second substrate and including cyan, magenta, and yellow color filter layers, each one of the cyan, magenta, and yellow color filter layers corresponding to one of the pluraliy of first electrodes and one of the plurality of second electrodes; and
a reflection layer on the first substrate and configured to reflect incident light outside a range of a viewing angle, the reflection layer further configured to control a color of an emitted light by applying a voltage to the first and second electrodes corresponding to at least one of the cyan, magenta, and yellow color filter layers causing the liquid crystals of the PDLC layer to allow an external light travelling through the CMY color filter and the PDLC layer to be reflected by the reflection layer such that no visible light is emitted from the reflective color display device, when no voltage is applied to the first and second electrodes corresponding to the at least one of the cyan, magenta, and yellow color filter layers the liquid crystals of the PDLC layer reflect visible light through the at least one of the cyan, magenta, and yellow color filter layers.

10. The reflective color display device of claim 9, wherein the PDLC layer further includes a black dye.

11. The reflective color display device of claim 10, wherein the black dye includes a dichroic dye having optical anisotropy.

12. The reflective color display device of claim 9, wherein the first and second substrates are transparent substrates, and the first and second electrodes include transparent conductive materials.

13. The reflective color display device of claim 9, wherein the plurality of first electrodes correspond to the cyan, magenta, and yellow color filter layers, and the plurality of second electrodes are a single unit that functions as a common electrode.

14. The reflective color display device of claim 9, wherein the first and second electrodes are stripes that cross each other.

* * * * *